United States Patent [19]

Pruessner

[11] Patent Number: 5,751,658

[45] Date of Patent: May 12, 1998

[54] SIGNAL PROCESSOR FOR NARROW BAND SONAR SIGNALS

[75] Inventor: Manfred Karl Pruessner, Washington, D.C.

[73] Assignee: The United States of America as represented by the Secretary of the Navy, Washington, D.C.

[21] Appl. No.: 78,330

[22] Filed: Sep. 1, 1970

[51] Int. Cl.⁶ ................................................ G01S 15/00
[52] U.S. Cl. ................................................ 367/98; 367/100
[58] Field of Search ............................ 340/3 R, 5 R, 340/6 R; 343/5 DP, 100 CL; 324/77 A; 235/92 DP; 367/98, 100

[56] References Cited

U.S. PATENT DOCUMENTS 3,046,545 7/1962 Westerfield .
3,380,018 4/1968 Littrell et al. .
3,517,172 6/1970 Dillard .

*Primary Examiner*—Daniel T. Pihulic

[57] ABSTRACT

A digital signal processor wherein a bit stream containing correlation information for a large sample size is converted into several basic correlation functions, each of which covers a small number of samples within the large input sample. Each basic correlation function is examined to determine whether it contains a valid sonar signal, and the original bit stream is then integrated over those time periods for which the corresponding basic correlation functions indicate the presence of a valid sonar signal. The resulting optimized digital correlation function is converted into an analog signal.

4 Claims, 6 Drawing Sheets

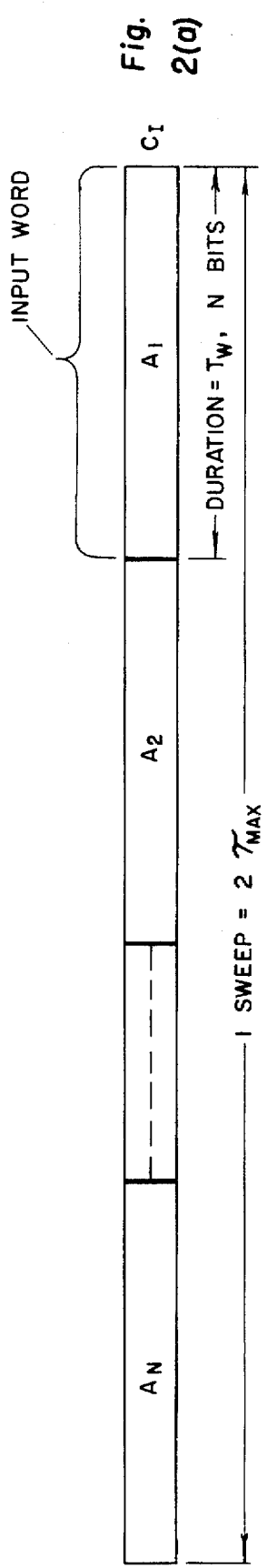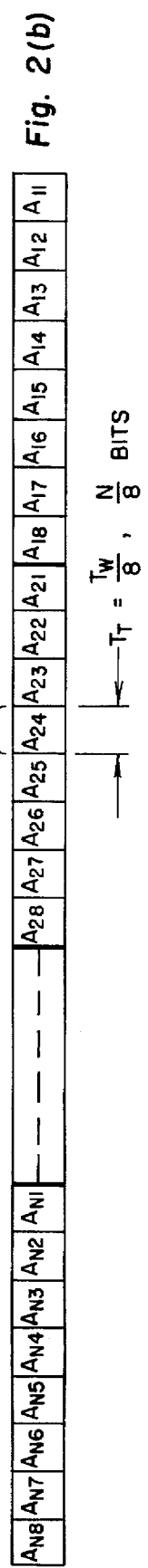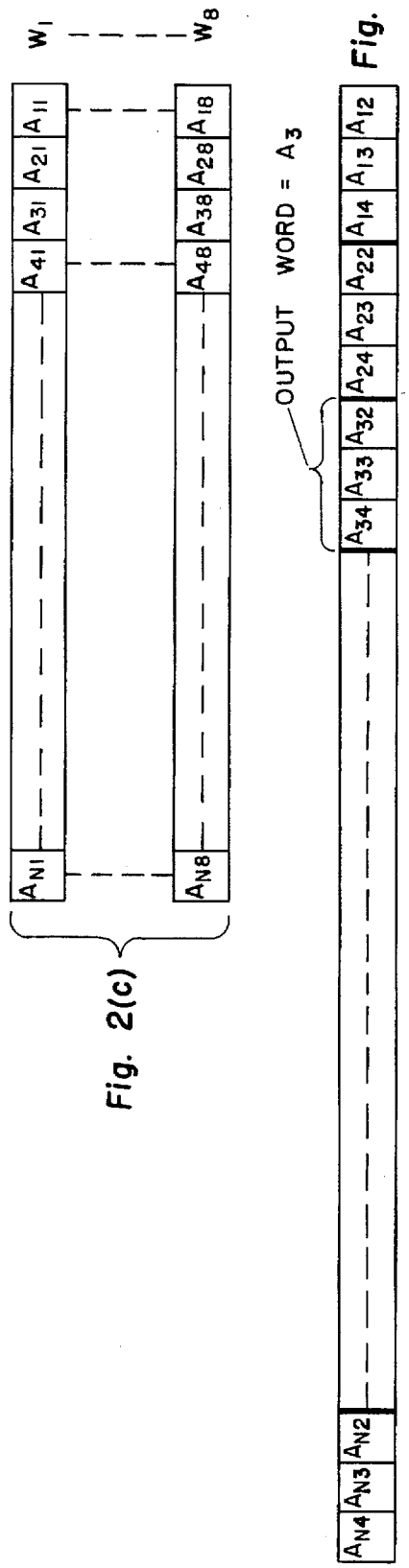

15,751,658

SIGNAL PROCESSOR FOR NARROW BAND SONAR SIGNALS

BACKGROUND OF THE INVENTION

This invention relates generally to digital signal processors, and more particularly to a digital signal processor for transient sonar signals.

Passive sonar detection systems operate by listening for sound signals emanating from a target and then determining from these signals the target's bearing and range. Such systems frequently employ correlation schemes to make these determinations. Prior art digital sonar correlation systems for passively detecting sonar signals such as disclosed in the application of J. C. Munson, Ser. No. 03/802,575, filed Mar. 27, 1959, now U.S. Pat. No. 4,198,704, have a fixed sampling interval and correlate a fixed number of samples to determine the correlation function. Consequently, these systems integrate over a fixed period of time Tm. However, in order to optimize the signal-to-noise ratio of a correlation function $R(\tau)$ it is necessary to integrate only for those portions of time T that a valid sonar signal is present. This requirement can be expressed by the following equation:

$$R(\tau) = \int_{t_o}^{t_o+T} f_1(t)f_2(t+\tau)dt \quad (1)$$

where $R(\tau)$=correlation function, $\tau$= time delay between the two sonar input signals $f_1(t)$ and $f_2(t)$, and $t_0$= arrival time of the sonar signals at the input to the system. Prior art systems, therefore, do not have optimal correlation function signal-to-noise ratios for sonar signals of duration T different from Tm. Thus, for example, if the incoming sonar signal is of a very short duration T relative to Tm the signal will be correlated over a period principally containing noise and the sonar signal may go completely undetected. As a consequence, the location of the source of the signal, such as a submarine, cannot be determined.

SUMMARY OF THE INVENTION

Accordingly, one object of this invention is the provision of a new and improved sonar correlation system.

Another object of this invention is to provide a system for optimizing the signal-to-noise ratio of a digital sonar correlation system.

Still another object of the instant invention is the provision of a transient signal processing system for determining the presence of a valid sonar signal.

A further object of this invention is the provision of a new and improved digital detector circuit for determining the presence of a valid sonar signal.

A still further object of this invention is to provide a new and improved digital rectifier circuit for use in determining the presence of a valid sonar signal.

Briefly, in accordance with one embodiment of this invention, these and other objects are attained by providing a detector network that converts an incoming bit stream containing correlation information into several basic correlation functions. Each basic correlation function is analyzed to determine the presence of a valid sonar signal. Simultaneously, the incoming bit stream is applied to a delay network, and at the completion of the delay period, the detector has determined those portions of time for which the incoming bit stream has a valid sonar signal. The detector controls a gating network that allows passage of the incoming bit stream for those portions of time, and the passed bit stream is integrated to obtain the final correlation function, which is then converted into an analog signal and displayed.

BRIEF DESCRIPTION OF THE DRAWINGS

FIG. 2 is a diagram of the word structure of various signals employed in the present invention;

DESCRIPTION OF THE PREFERRED EMBODIMENT

Figure 1:
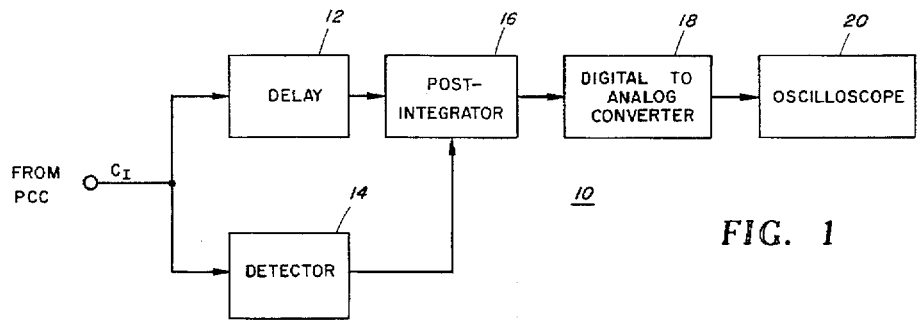
FIG. 1 is a block diagrammatic view of the overall digital signal processor of the present invention.

Referring now to the drawings wherein like reference characters designate identical or corresponding parts throughout the several views, and more particularly to FIG. 1 thereof, wherein an input signal composed of a compressed time, binary bit stream $C_1$ of sample size N bits containing sonar correlation information is shown as being applied to a digital signal processor 10. Such a signal may be produced, for example, by the polarity coincidence correlator (PCC) disclosed in the aforeidentified application of J. C. Munson. Input bit stream $C_1$ from the polarity coincidence correlator (PCC) is applied simultaneously to a conventional delay line 12, such as a magnetostrictive delay line, and a detector network 14. Delay line 12 time-delays input bit stream $C_1$ by a time Tm that equals, for reasons discussed hereinafter, the time for one full sweep of a correlation function having an integration time Tm.

Input bit stream $C_1$ contains correlation information for N different values of $\tau$, wherein for each value of $\tau$, N bits have been generated. The total time for sampling these N bits is Tm. Thus, in real-time, a complete correlation function containing $N^2$ bits of information would require a real-time period of N·Tm. However, the input bit stream has been time-compressed by a factor of N, in a manner consistent with the aforeidentified patent application. It, therefore, contains the $N^2$ bits of a full sweep of the correlation function in the time period Tm. Thus, it will be apparent to one skilled in the art that the time Tm not only equals the time for N samples in real time, but also equals the time for one complete sweep of the correlation function having N values of $\tau$.

While input bit stream $C_1$ is being time-delayed by one full sweep, by delay line 12, detector 14 determines when a valid sonar signal has commenced, i.e. $t_0$, and the duration T of that signal. At the completion of delay time Tm, the output signal from delay network 12 is fed to a post-integrator circuit 16 whose operation is controlled by the output signal from detector 14. Post-integrator 16 integrates; i.e., adds, the bit stream from delay network 12 only for those portions of time T for which it has been previously determined by detector 14 that a valid sonar signal is present. The resulting correlogram is converted from binary to analog in a conventional digital-to-analog converter 18.

The analog output of converter 18, representing the final optimized correlogram, may then be displayed visually on an oscilloscope 20, or otherwise used to indicate the presence of a valid sonar signal.

The binary word structure of the system is illustrated in FIG. 2. The binary input stream, $C_1$, shown in FIG. 2a, consists of a string of words, each word representing the correlation value for a particular delay time $\tau i$ ($i=1,2,3,\ldots$ N). The complete input correlogram of one sweep over the entire range of $\tau$ contains N words, each of duration $T_w$. Each word $A_i$ ($i=1,2,3,\ldots$ N) consists of a serial string of N time-compressed bits of magnitude "1" or "0" which, when counted, represent the magnitude of the correlogram for the particular delay time $\tau i$. The word duration $T_w$ is related to the sampling time Tm for the N bits of the input signal by the following relation:

$$Tm = N\, Tw \qquad (2)$$

where N=time compression ratio.

To determine which bits of each input word $A_i$ contain a valid sonar signal, each word is broken up into a number of smaller basic words in detector 14, as shown in FIG. 2b. The number of basic words per input word is determined by the sonar signal of smallest expected duration Tmin. In the present invention, it is assumed that $$Tmin = \frac{Tm}{8}\ .$$

Consequently, each input word $A_i$ has eight basic words $A_{ij}$ ($j=1,2,\ldots$ 8) wherein each basic word has N/8 bits, and is of a duration $T_T = T_W/8$. It should be understood, however, that there may be a fewer or greater number of basic words per input word corresponding to the ratio of Tm to Tmin.

Figure 3:
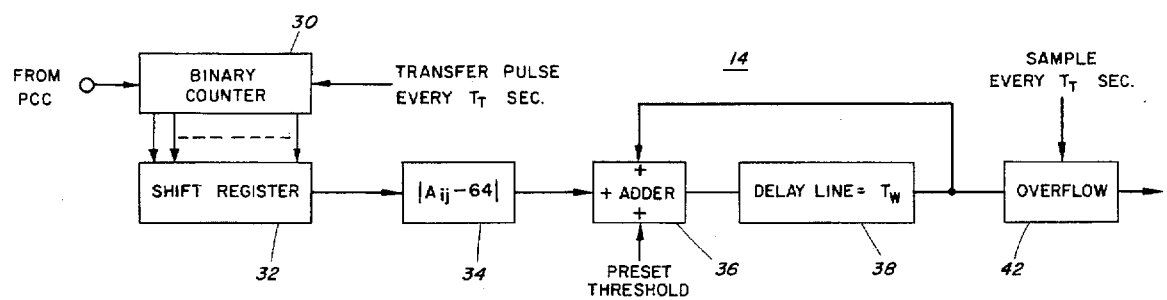
FIG. 3 is a block diagrammatic view of the detector utilized in the processor of FIG. 1.

The basic words are produced in detector 14 in a manner which will be more fully described in connection with FIG. 3. The input bit stream $A_1, A_2, \ldots$ An is fed to a conventional ripple-through counter 30. Counter 30 has one fewer stage than the number of stages necessary to count the maximum binary value of a basic word. Thus, for example, if each input word has N=1024 bits, and there are eight basic words per input word, each basic word will consist of 128 bits, requiring an eight stage counter. Therefore, counter 30 has seven stages and is capable of counting from 0 to 127. For the maximum value of 128, counter 30 will be reset to 0.

The binary value in counter 30 is parallel transferred out of the counter into a conventional serial shift register 32 under the control of a transfer pulse every $T_T$ seconds.

Detector 14 determines which portions of the input words contain valid sonar signals by processing the basic words, in a manner to be more fully described hereinafter to effectively obtain eight basic correlation functions, $W_j$ ($j=1,2,\ldots$ 8) corresponding to the eight segments of time Tmin contained within time Tm. The word structure of the eight basic correlograms $W_j$ is illustrated in FIG. 2c. Thus, for example, if the system input correlation function represents a sampling between time $t_0$ and $t_0+Tm$, then $W_1$ represents a correlation function for sonar signals between $t_0$ and $t_0+T_{min}$, $W_2$ represents a correlation function for sonar signals between $t_0+T_{min}$ and $t_0+2\, T_{min}$, and $W_8$ represents a correlation function for sonar signals between $t_0+7\, T_{min}$ and to+Tm.

As long as there is no sonar signal present in the input each basic correlogram will consist of noise words only, resulting in an output from binary counter 30 that fluctuate from 0 to 127 (remembering that 128=0 in counter 30) about mean 64. Statistically, the average value $\overline{R}_{ij}$ of the output from counter 30 about the mean is:

$$R_{ij} = \overline{|A_{ij} - 64|} = \frac{128}{\sqrt{2\pi}} \approx 4.5 \qquad (3)$$

($i=1,\ldots$ N), and ($j=1,\ldots$ 8). If a sonar signal from a point source is presently in the input correlation bit stream $C_1$ will be highly correlated, and, accordingly, $\overline{R}_{ij}$ will be greater. This effect is used by the detector to determine the presence of a sonar signal. A digital rectifier 34, which will be more fully described hereinafter, receives the output of shift register 32 and determines $|A_{ij}-64|$ for each basic word $A_{ij}$. The resultant signal is fed to a conventional serial adder 36. The output of adder 36 is applied to a delay line 38 of Tw seconds delay wherein it is retarded. The output of delay line 38 is fed back to adder 36 wherein it is added to the signal from rectifier 34 in a time-shared manner resulting in sums $S_j$ ($j=1,2,\ldots$ 8), wherein $$S_j = \sum_{i=1}^{1024} R_{ij} \cdot I f,$$

for example, the input signal during a time period covered by correlagram $W_5$ is pure noise, then $\overline{R}_{i5} \approx 4.5$ for every word Ai5 ($i=1,2,\ldots$ 1024) in accordance with equation (3). Thus, $$S_5 = \sum_{i=1}^{1024} \overline{R}_{i5} \approx (1024)(4.5) = 4608$$

for pure noise.

Figure 4:
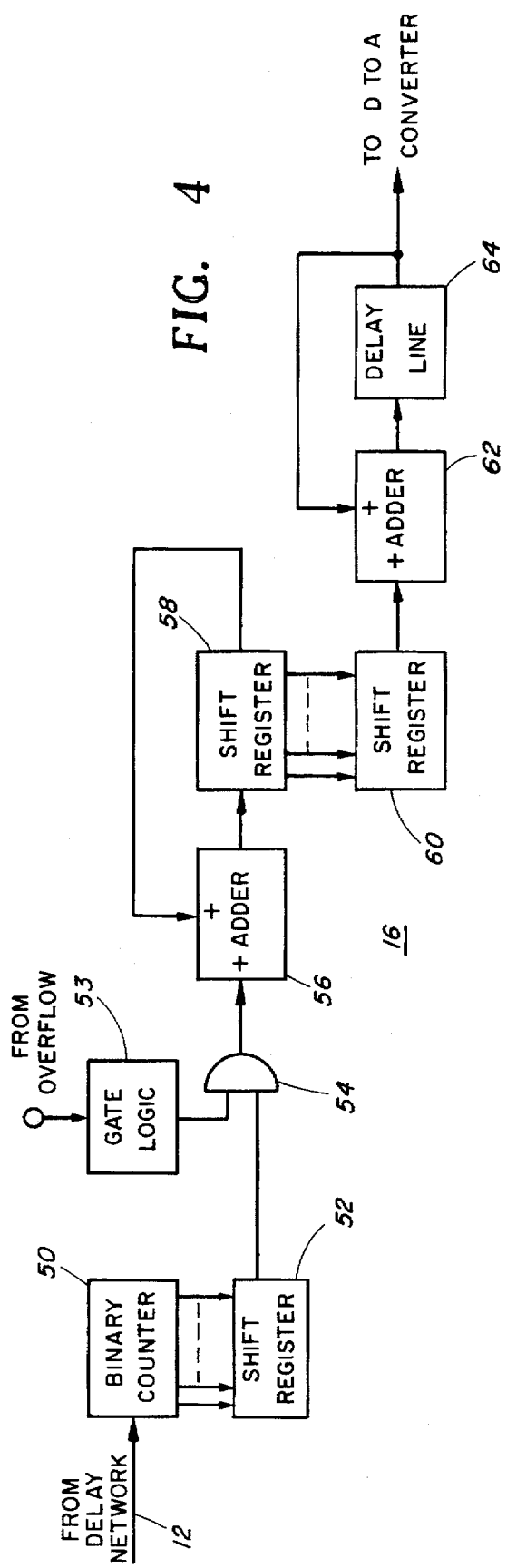
FIG. 4 is a block diagram of the post-integrator utilized in the processor of FIG. 1.

Sums $S_j$ indicate by their magnitude whether a sonar signal was present during any of the eight basic time periods. Accordingly, an appropriately chosen threshold number, to be more fully discussed hereinafter, is pre-set in adder 36 at the beginning of each sweep, and added only to $\overline{R}_{1j}$ ($j=1,2,\ldots$ 8). If any of sums $S_j$ are larger than a fixed value, indicating the presence of a valid sonar signal, an overflow signal will be generated for those sums in an overflow circuit 42, in a manner to be more fully described hereinafter. The overflow signals thus generated are stored by overflow circuit 42 and at the end of the delay period Tm of delay line 12, these signals are fed to post-integrator The componental elements of post-integrator 16 are illustrated in block diagram form in FIG. 4. The delayed bit stream from delay network 12 is applied to a conventional ripple-through binary counter 50 having one more stage than binary counter 30. In this way the input bit stream is converted into a string of smaller basic words 128 bits long and then converted into binary numbers between 0 and 128, similar to the operation of binary counter 30, only delayed by one full sweep of Tm seconds. After every 128 bits have been counted in binary counter 50, the resulting binary number is parallel transferred to a conventional shift register 52 which serially shifts the binary value into an AND gate 54.

The signals stored in overflow circuit 42 are applied to gate logic 53 in post-integrator 16 at the end of delay Tm and stored therein. If detector 14 has determined that a valid sonar signal is present, in a particular time period, the appropriate stored signal in gate logic 53 generates an output signal that opens AND gate 54, allowing the passage of the binary value. By appropriate timing, an overflow signal produced by a sum $S_j$ is applied to gate 54 when a binary word from the corresponding correlogram $W_j$ reaches gate 54 from shift register 52. Since, as shown in FIG. 2b, every eighth word out of shift register 52 will be from a particular correlogram $W_j$, and since every eighth sum appearing at the output of delay line 38 is the corresponding $S_j$, if $S_j$ produces an overflow signal in overflow circuit 42 after each pass through delay line 38, every binary word $A_{ij}$ (i=1,2, ... 1024) in $W_j$ will be passed through gate 54. Thus, for example, if the basic correlograms $W_2$, $W_3$, and $W_4$ contained sonar information, the output from gate 54 would be a sequence of binary words, each of a value between 0 and 128, as follows: $A_{12}$, $A_{13}$, $A_{14}$, $A_{22}$, $A_{23}$, $A_{24}$, ... $A_{n2}$, $A_{n3}$, $A_{n4}$. This sequence is shown in FIG. 2d.

The output word stream from gate 54 is applied to a conventional serial adder 56 for the purpose of reconstructing the complete correlogram from the eight basic correlograms. This is achieved by adding all basic words $A_{ij}$ (j=1, ... 8) in each input word $A_i$ (i=1,2, ... 1024) which emerge from gate 54. From the previous example, if basic correlograms $W_2$, $W_3$ and $W_4$ emerge from gate 54, then adder 56 will produce the following sums: $A_1=A_{12}+A_{13}+A_{14}$, $A_2=A_{22}+A_{23}+A_{24}$, ... $A_n=A_{n2}+A_{n3}+A_{n4}$. To achieve this function, the output from adder 56 is fed to a conventional shift register 58. The time delayed output from shift register 58 is fed back to adder 56 in a manner, to be more fully described hereinafter, that the above summations are produced.

After the sums $A_i$ (i=1,2, ... 1024) have been generated, they are parallel transferred out of shift register 58 into a conventional shift register 60, and then serially shifted into a conventional serial adder 62. Sums $A_i$ represent correlation information for one complete sweep; i.e., all values of $\tau$, over the input integration time $T_m$. It may occur, however, that the sonar signal covers a longer period of time than $T_m$. In this case, equation (1) is still applicable, and the optimal correlation signal-to-noise ratio is obtained by integrating the correlation bit stream over the full duration of the sonar signal. Thus, for signals of such long duration, the basic correlograms of successive sweeps must be added for optimization. In the present invention this is accomplished by storing one complete sweep of sums $A_i$ in a conventional delay line 64, such as a magnetostrictive delay line, and feeding back these sums after a delay of $T_m$ to adder 62 where they are added to the corresponding sums of the next succeeding sweep. The partial sums are then stored in delay line 64 and again fed back to adder 62 as long as the original sonar signal continues. Thus, for example, if the sonar signal is of duration $3T_m$, covering correlograms $C^1$, $C^2$ and $C^3$, the final correlogram will consist of words $A_i$ (i=1,2, ... 1024), wherein $$A_i' = \sum_{K=1}^{3} A_i^K.$$

The output of delay line 64 is applied to the digital-to-analog converter 18 of FIG. 1, wherein the final correlogram is converted into an analog signal.

Figure 5:
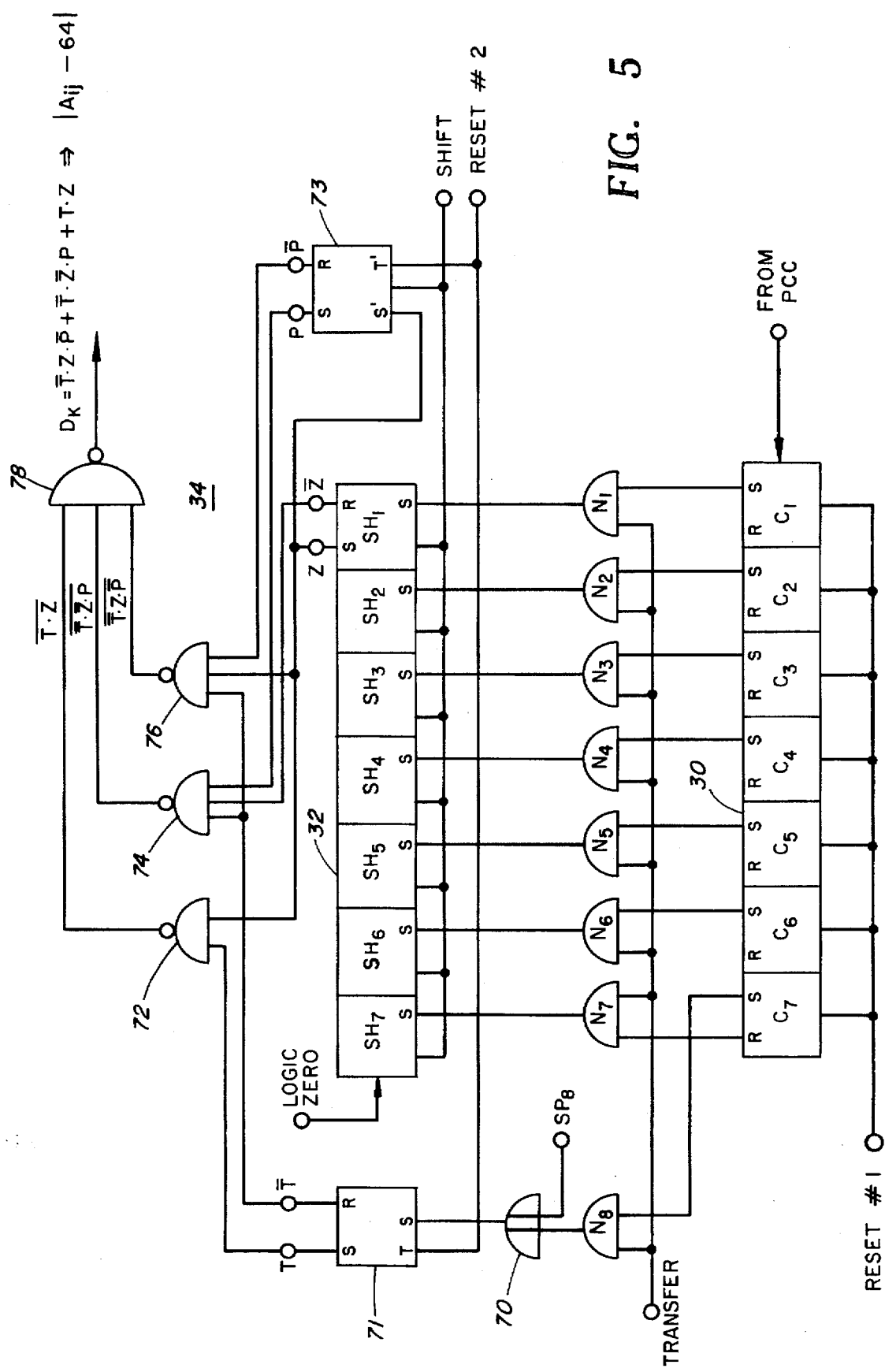
FIG. 5 is a schematic diagram of the binary counter, shift register, and digital rectifier of the detector of FIG. 3.
Figure 6:
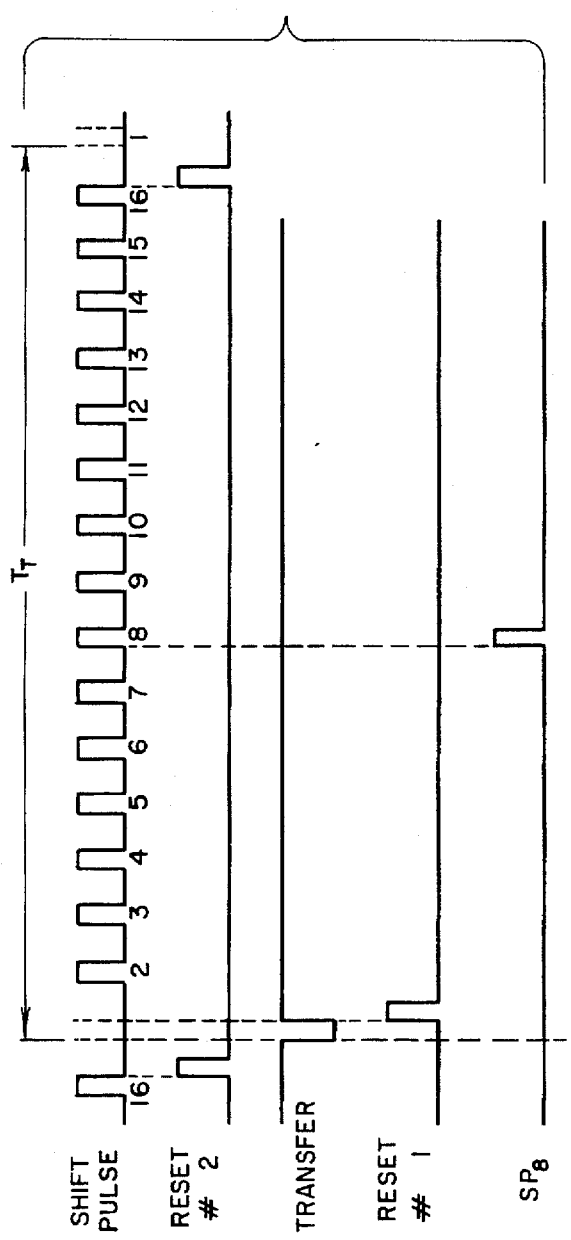
FIG. 6 is a timing diagram for the control pulses of FIG. 5.

FIG. 5 illustrates in greater detail the binary counter 30, shift register 32 and digital rectifier 34 of detector 14. As discussed hereinbefore with reference to FIG. 3, the PCC bit stream $C_1$ is applied to seven stage ripple-through counter 30. Since, for the purposes of determining $|A_{ij}-64|$, the relation $|0-64|=|128-64|$ holds, it is only necessary that counter 30 have seven stages. If the incoming basic word were to have a value of 128, each stage in counter 30 would return to zero, but, as seen above, this would not affect $R_{ij}$. After a basic word of 128 bits has been counted in time $T_T$, a transfer pulse is generated, as shown in FIG. 6. The set outputs from stages $C_1$ through $C_6$ of counter 30 are applied to AND gates $N_1$ through $N_6$, respectively, and the reset output of stage $C_7$ is applied to an AND gate $N_7$. On the occurrence of the transfer pulse, the set outputs from counter stages $C_1$ through $C_6$ are transferred to stages $SH_1$ through $SH_6$, respectively, of shift register 32, while the reset output from stage $C_7$ is transferred to stage $SH_7$ of shift register 32. Simultaneously, the set output of $C_7$ is transferred through an AND gate $N_8$, through an OR gate 70 to a flip-flop 71. Thus, at the end of a transfer pulse, shift register 32 has been loaded with the number contained in binary counter 30, except for stage $SH_7$ which contains the complement of the seventh bit of counter 30. Immediately after the transfer pulse, a reset #1 pulse is generated, as shown in FIG. 6, that completely resets binary counter 30 in anticipation of the next basic word to be counted.

After shift register 32 has been loaded, its contents are shifted out serially through stage $SH_1$ under the control of shift pulses, $SP_j$ (j=2,3, ... 16), illustrated in FIG. 6. It should be understood that the shift pulses are generated in response to the clocking system of the input bit stream, not shown. As shown in FIG. 6 no shift pulse is contained in the $SP_1$ position since a seven bit shift register, such as shift register 32 requires only six shift pulses to completely shift out the word contained therein. The nine extra shift pulses $SP_8$–$SP_{16}$ are applied to shift register 32 during the period $T_T$ for reasons to be fully explained hereinafter. As each bit is shifted out of the register, a logical "0" is entered into stage $SH_7$. Consequently, after the seventh bit of basic word $A_{ij}$ leaves shift register 32 a string of nine zeros follows, resulting in a new word length of sixteen bits, the first seven of which contain the binary value of the basic word, and the last nine of which contain zeros.

When the set output, Z, of shift register 32 is a "1", a flip-flop 73 is loaded, and its set output P becomes "1" on the next succeeding shift pulse. Set output T from flip-flop 71 and set output Z from shift register stage $SH_1$ are applied to a NAND) gate 72. Reset output $\overline{T}$ from flip-flop 71, reset output $\overline{Z}$ from shift register stage $SH_1$ and set output P from flip-flop 73 are applied to a NAND gate 74. Outputs $\overline{T}$, Z, and $\overline{P}$ are applied to a NAND gate 76. The resulting terms $T \cdot Z$, $T \cdot \overline{Z} \cdot P$, and $\overline{T} \cdot Z \cdot P$ are applied to a NAND gate 78. The outputs from gate 78 are the terms $D_K = \overline{T} \ Z \ \overline{P} + \overline{T} \ Z \ P + T \ Z$ (K=1,2, ... 16), wherein the first seven bits in the string, $D_7 D_6 \ldots D_1 = |A_{ij}-64| = R_{ij}$ for all values $0 \leq A_{ij} \leq 128$, and the last nine bits $D_{16}D_{15}D_{14} \ldots D_8 = 00 \ldots 0$. It should be understood that the terms Z and $\overline{Z}$, representing the outputs of shift register 32, may vary for the first six shift pulses, $SP_2$–$SP_7$, but for $SP_8$–$SP_{16}$, Z=0. It should also be understood that T and $\overline{T}$ are initially determined at the beginning of each shift cycle when $A_{ij}$ is transferred from counter 30 to shift register 32, and at $SP_8$, T is set equal to one by-shift pulse $SP_8$ into OR gate 70. Finally, it should be noted that P=0 until, Z=1, and thereafter P=1. Thus, for example, if $A_{ij}=68=1000100$, then T=1 initially and $D_K=Z$. Since shift register 32 contains 0000100=4; i.e., $S_7=0$ in the seventh stage, this value correctly represents $|A_{ij}-64|=68-64=4$ that is shifted out of register 32. On the other hand, if $A_{ij}<64$, for example $A_{ij}=58=0111010$, then T=0 initially, and $D_K=\overline{Z}\overline{P}+ \overline{Z}P$. Since P=0 until Z=1, then $D_K=\overline{Z}$. Thus, $D_1=0$ and $D_2=1$. But, inasmuch as Z=1 at the second least significant bit of $A_{ij}$, flip-flop 73 becomes set, wherein P=1 for the remaining bits of $A_{ij}$. Thus, $D_K$ (K=3, ... 7)=$\overline{Z}$, and $D_3=1$, $D_4=D_5=D_6=D_7=0$. The final result is: $0000110=6=|A_{ij}-64|=|58-64|$. At the end of $SP_{16}$, a reset #2 pulse is generated that resets all stages $SH_1$–$SH_7$ of shift register 32, and flip-flops 71 and 73. It should be apparent therefore, that the shift pulses perform as a master clock for the other control pulses of FIG. 6 in a conventional manner.

The bit stream $D_k$ representing the binary numbers $\overline{R}_{ij}$ (i=1,2, ... 1024), (j=1,2, ... 8) is fed to serial adder 36. At the beginning of each sweep, $\overline{R}_{ij}$ is added to a preset sixteen bit binary number M, which may be toggled into adder 36 and gated off after the sum has been performed, wherein $0 \leq M \leq 2^{15}-1$. This number is determined by the following relationship:

$$(S_j)_{min}+M=2^{15} \ (j=1,2, \ldots 8) \tag{4}$$

wherein $(S_j)_{min}$=the minimum value of $S_j$ for which it is believed a sonar signal is present. In the example presented hereinbefore, wherein a pure noise signal was considered, $S_5$=4608. If the threshold were to be set at one variance $T_s$ above this value, and, for example, $T_s$=1100, then $(S_j)_{min}$= 5708, and M=27,060. It will be readily understood that the extra nine bits $D_{16}D_{15} \ldots D_8$ were affixed onto each number $\overline{R}_{ij}$ emerging from digital rectifier 34 to provide sufficient word length for the sums $S_j$ in adder 36.

Figure 7:
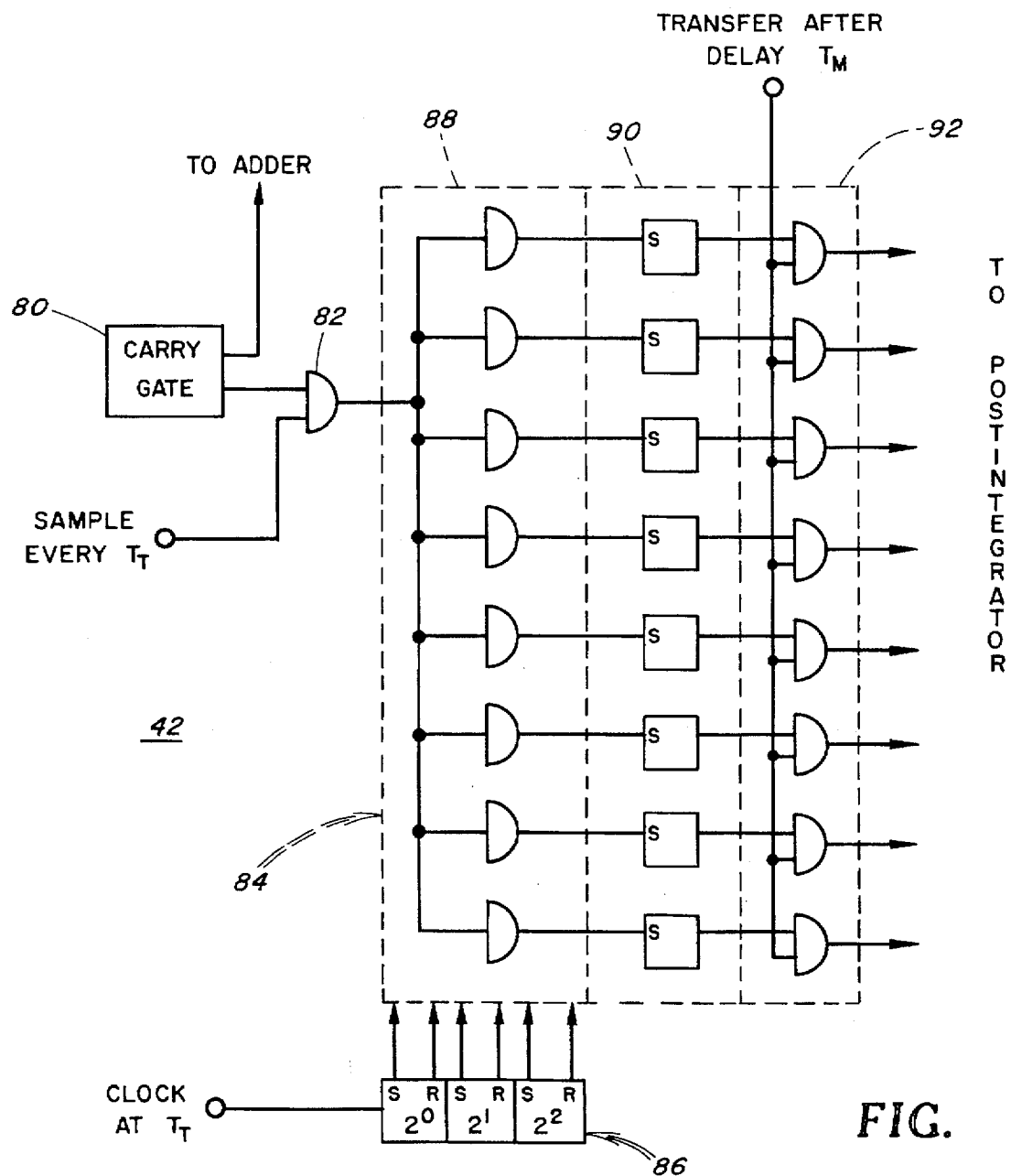
FIG. 7 is a schematic diagram of the overflow circuit employed in the detector of FIG. 3.

If any of the Sums $S_j$ exceed $(S_j)_{min}$, $(S_j)_{min}$+M will be greater than $2^{15}$ and a "1" will be carried over into the sixteenth bit position of $S_j$. Referring now to FIG. 7, wherein overflow circuit 42 is illustrated in greater detail carry gate 80 generates the carry bits for serial adder 36 in a conventional manner. The output of carry gate 80 is fed to an AND gate 82, and the carry bit from bit position fifteen to sixteen of $S_j$ is sampled to determine whether an overflow has occurred. The output of AND gate 82 is fed to a decoding network 84 to determine which sum $S_j$ has had an overflow. A three stage binary counter 86, under the control of a clock at rate $T_T$, generates a sequence of numbers between 0 and 7. These are fed to AND gate 88 in a conventional manner such that succeeding gates are enabled for each succeeding count of counter 86. Consequently, if an overflow bit from $S_j$ is generated, it will be passed through the appropriate AND gate in network 88. The outputs from gates 88 are individually fed to flip-flops 90, such that a "1" output from any AND gate will set the corresponding flip-flop. The outputs of network 90 are individually applied to AND gates 92 and at the end of delay period Tm in delay line 12, the outputs of flip-flops 90 are passed through their respective gates 92 to postintegrator 16 by a transfer pulse. Thus for each basic time period $T_T$, if it has been determined that a valid sonar signal is present in detector 14, a single bit will be transferred to post integrator 16 that will determine whether it will integrate the input bit stream $C_1$ for that time period.

Figure 8:
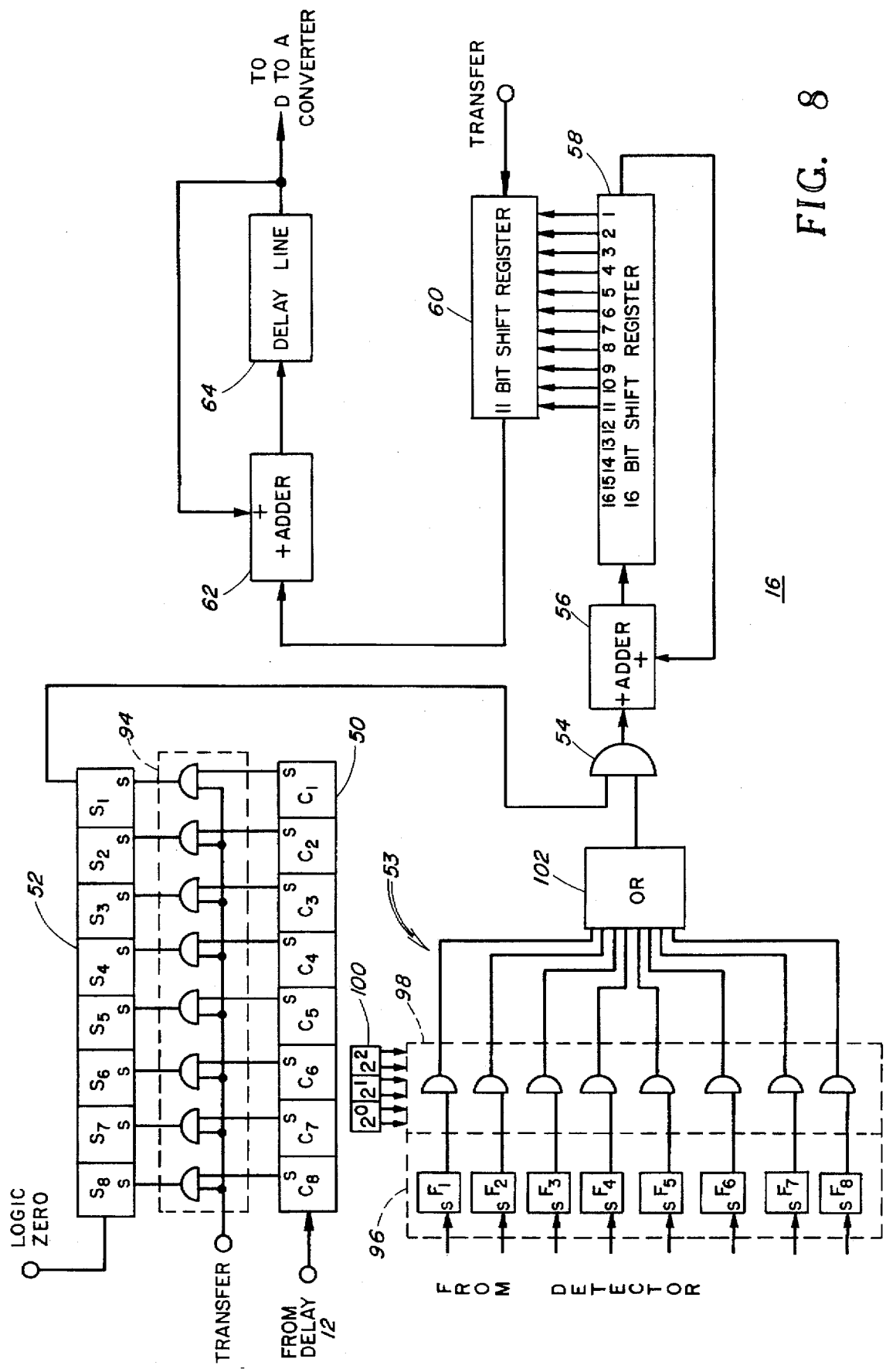
FIG. 8 is a schematic diagram of the gate circuit, binary counter and shift registers used in the post-integrator circuit of FIG. 4.

FIG. 8 illustrates in greater detail the post integrator circuit 16 of the overall system of FIG. 1. The delayed bit stream $C_1$ from delay network 12 is applied to ripple through binary counter 50. As discussed hereinbefore counter 50 has eight stages, as opposed to counter 30 which only has seven stages, and is therefore capable of counting between 0 and 128, the full range of a basic word. After 128 bits have been counted, the binary value in counter 50 is transferred to shift register 52 by a set of AND gates 94, in the same manner as the detector circuit of FIG. 5. The eight bit binary number is shifted out of shift register 52 and, as in shift register 32, fifteen shift pulses are employed. The words emerging from shift register 52, therefore, are sixteen bits long, that first eight of which contain the basic word, and the last eight of which are zero.

The output signals from AND gates 92 in decoder 84 are applied to respective flip-flops 96 in gate logic 53 at the end of delay time Tm. This, if a sum $S_j$ has produced an overflow signal, the appropriate flip-flop in network 96 will be set at the end of delay period Tm. The outputs from flip-flops 96 are individually applied to AND gates 98. A sequential, recycling counter 100 of the same type as counter 86 enables each AND gate in network 98 during the time that a basic word $A_{ij}$ corresponding to the sum $S_j$ is being shifted out of shift register 52. The outputs of AND gate network 98 are applied to an OR gate 102. The outputs of OR gate 102 and shift register 52 are both applied to an AND gate 54. Thus, if a valid sonar signal is present during a basic time period $T_{min}$, gate 54 will be enabled, and the corresponding basic word $A_{ij}$ will be passed to a serial adder 56. It will be understood that counter 100 will cycle AND gates 98 once in time $T_T$. Consequently, each flip-flop in network 96 that has been set will enable gate 54 N times during one sweep, thereby enabling all words $A_{ij}$ (i=1,2, ... N) for the particular values of j to pass through gate 54.

Each word that passes through AND gate 54 is time delayed by time $T_T$ in a sixteen bit shift register 58 and then fed back to adder 56. Thus, if the next succeeding word emerging from shift register 52 is also passed through AND gate 54, the two words are added in serial adder 56. FIG. 2d illustrates this process for the case where flip-flops $F_2$, $F_3$, and $F_4$ of network 96 have been set. The resulting sums are $$A_i = \sum_{j=1}^{3} A_{ij}.$$

At the end of each time period $T_w$, the sums $A_i$ are transferred from shift register 58 to shift register 60 in a conventional manner. As illustrated in FIG. 8, only the first eleven bits are transferred. As discussed hereinbefore, only the first eight bits of the sixteen bit basic words emerging from shift register 52 contain the binary value of the basic words. Since a maximum of eight of these words can be added together in adder 56, with a maximum value of 1024, only eleven bits are required to contain the resulting sums. Consequently, only the first eleven bits of each sum $A_i$ are transferred into shift register 60.

The eleven bit words $A_i$ are serial shifted out of shift register 60 into adder 62. As discussed hereinbefore, these words are time-delayed by one full sweep in delay line 64 and then fed back to adder 62 and added with the corresponding words $A_i$ of the next succeeding sweeps if the sonar signal covers multiple sweeps.

It will be apparent that the apparatus of the instant invention optimizes the signal-to-noise ratio of the correlation function for a sonar signal. Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A digital detector for determining the presence of valid sonar signals in an input bit stream containing correlation information comprising:

means for counting a fixed number of bits in said bit stream to produce a sequence of binary words;

means for digitally rectifying said binary words about their mean value to produce a sequence of average values about said mean;

means for adding selected ones of said average values to produce a sequence of output sums corresponding to basic correlation functions of different portions of said input bit stream; and means for determining from the magnitude of each of said sums whether said valid sonar signal is contained in the corresponding portion of said input bit stream.

2. The detector of claim 1, wherein said counting means comprises:

a binary ripple-through counter; and a serial shift register parallel coupled to said binary ripple-through counter for shifting said binary words into said digital rectifying means.

3. The detector of claim 1, wherein said adding means comprise a binary serial adder having a carry gate and a delay line, said delay line having as its input the output of said adder, and said adder having as its inputs the output of said delay line, the output of said digital rectifying means, and a preset threshold value.

4. The detector of claim 3, wherein said determining means comprises:

said carry gate from said binary serial adder;

an AND gate for passing the output of said carry gate only for a selected bit position of said output sums; and means for decoding the output of said AND gate to determine which of said output sums has produced an overflow into said selected bit position; and means for storing the outputs of said decoding means.

* * * * *